United States Patent [19]

Macomber et al.

[11] Patent Number: 5,406,050
[45] Date of Patent: Apr. 11, 1995

[54] MULTIPLE OPERATOR WELDING APPARATUS

[75] Inventors: Bruce G. Macomber, Chattanooga; Bill K. Niles, Hixson; Gregory S. Lann, Chattanooga, all of Tenn.

[73] Assignee: Advanced Fusion Technologies, Inc., Chattanooga, Tenn.

[21] Appl. No.: 958,647

[22] Filed: Oct. 8, 1992

[51] Int. Cl.$^6$ .............................................. B23K 9/10
[52] U.S. Cl. .................................. 219/130.1; 219/132
[58] Field of Search .................. 219/130.1, 132, 136; 361/606, 608, 725

[56] References Cited

U.S. PATENT DOCUMENTS

| | | | |
|---|---|---|---|
| 2,680,225 | 6/1954 | Stevens, Jr. | 219/136 |
| 3,150,312 | 9/1964 | Willecke et al. | |
| 3,324,379 | 6/1967 | Mulder | |
| 3,808,397 | 4/1974 | Wixson | 219/132 |
| 3,809,853 | 5/1974 | Manz | |
| 3,851,141 | 11/1974 | Cooper | 219/132 |
| 4,117,304 | 9/1978 | Wodzinski et al. | 219/130.1 |
| 4,523,077 | 6/1985 | Hoyt, Jr. et al. | |

FOREIGN PATENT DOCUMENTS

| | | |
|---|---|---|
| 1401677 | 6/1964 | France . |
| 2375546 | 7/1978 | France . |
| 52-71356 | 12/1975 | Japan . |
| 837665 | 9/1979 | U.S.S.R. . |

OTHER PUBLICATIONS

Miller Electric Mfg. Co. Owner's Manual, dated No. 1978.
PowCon Lift-Paks & Rack Paks, dated 1990.
Mark VIII-2 Poly-Weld System, undated.

*Primary Examiner*—Clifford C. Shaw
*Attorney, Agent, or Firm*—Varnum, Riddering, Schmidt & Howlett

[57] ABSTRACT

A multiple operator welding apparatus is disclosed which is particularly well suited for use in stick arc welding, GTAW, FCAW, ACAC, and GMAW arc welding processes. One or more welding modules are selectively mounted in a main power frame and connected to the power source by a knife blade connector which permits removal and replacement of one or more welding modules while the power source is in use. The knife blade connector also permits one or more welding modules to be removed from the main power frame and used at a remote location. The welding module for use with the multiple operator welding apparatus incorporates an inductor which permits use of a reduced incoming module voltage while producing a satisfactory weld. The reduced incoming module voltage results in significant energy savings.

41 Claims, 11 Drawing Sheets

MULTIPLE OPERATOR WELDING APPARATUS

BACKGROUND OF THE INVENTION

1. Field of the Invention

This invention relates to a welding apparatus and, more particularly, to a welding apparatus suitable for use by multiple operators and for a welding apparatus suitable for use with a reduced input voltage.

2. Description of Related Art

There are numerous different welding processes utilized in the welding industry for welding various materials under different circumstances. These welding processes include stick arc welding, shielded metal arc welding (SMAW), gas tungsten arc welding (GTAW), flux core arc welding (FCAW), air carbon arc gouging and gas metal arc welding (GMAW). These several different welding processes are performed in numerous environments ranging from factories, construction sites to shipyards. Most arc welding operations are performed using direct current from either a DC power source or, more commonly, from an AC power source which has been converted from AC to DC.

Multiple operator welding machines were developed to permit several welding arcs to be struck from a single common power supply. The power supply typically has a transformer and rectifier to step down and convert the power from AC to an acceptable DC level. The known multiple operator welding machines are a saturable reactor type welding unit having a plurality of welding modules. Each welding module corresponding to a single welding arc requires a magnetic amplifier for generation of an acceptable arc. Such a saturable reactor type unit with magnetic amplifiers in each module is extremely heavy and very difficult to transport around a job site or to a new job site.

A further drawback of the known saturable reactor type multiple operator welding machine is that the welding processes which can be performed from the unit are limited. No known multiple operator welding machines can perform GMAW welding in addition to other welding processes such as stick, SMAW, GTAW or FCAW. GMAW operations on these welding machines must be performed with a voltage sensing wire feeder. In addition, none of the known multiple operator welding machines permit two or more different processes to be conducted from a single multiple operator welding machine at the same time absent the use of a voltage sensing wire feeder.

In light of the deficiencies, the known multiple operator welding machines are limited in their flexibility and versatility of use.

The arc voltage between a workpiece and a welding electrode is dependent upon the spacing between the two electrically charged members. As the spacing increases, the voltage increases and the current flow can decrease. When the spacing between the electrode and the workpiece is too great, an insufficient amount of current will flow, potentially resulting in defects such as spatter and lack of fusion. As the spacing increases, the arc will ultimately be extinguished.

Conversely, as the spacing between the electrode and the workpiece decreases, the voltage decreases and the current increases. If the spacing between the electrode and the workpiece is too small, the voltage will drop to an unacceptable level and excessive current will flow to the workpiece. This can result in gouging the workpiece or short circuiting the arc.

For most GMAW welding operations, it is desired to maintain a certain arc voltage and current flow, therefore, the spacing between the welding electrode and the workpiece must be maintained substantially constant. However, this spacing is constantly changing in light of globules of metal which drip from the welding electrode, the inability of the welder to hold the electrode steady and irregularities in the structure of the workpiece. Conversely, other welding procedures such as SMAW require varying the arc length to create different voltage, current and temperature levels. It is imperative that the arc not be extinguished or short circuit during these fluctuations in the arc length.

An additional problem with the known welding apparatus is that each welding module is based on a welding module input voltage of 80 volts DC from the rectifier of the transformer of the power frame. 80 volts DC is generally regarded as the voltage required to produce a relatively stable arc, i.e. the current fluctuation as a result of change in the arc voltage is acceptable. This input voltage is required even though the arc voltage is typically in the range of 25 to 35 volts. The 80 volt welding module input voltage is commonly reduced to the lower arc voltage by resistors or other suitable means. The power lost in reducing the voltage from 80 volts to 25 arc volts is significant. The lost power is converted into heat which must be vented from the machine. The power loss due to voltage reduction results in very uneconomical power usage and increases the likelihood of overheating of the welding units.

SUMMARY OF INVENTION

The multiple operator welding apparatus according to the invention improves the prior art multiple operator welding machines by creating a multiple operator, multiple process system contained in a single package. The multiple operator welding apparatus according to the invention can perform stick, SMAW, GTAW, FCAW, air arc and GMAW welding processes from a single unit. In addition, different welding processes can be performed at the same time from a single multiple operator welding apparatus according to the invention.

The multiple operator welding machine according to the invention also permits the removal of one or more modules from the multiple operator unit without requiring the power to be turned off to the entire unit, thereby disrupting other welders operating from main power unit. Moreover, the multiple operator welding apparatus according to the invention permits use of 60 volts DC input into each module rather than 80 volts DC because of the incorporation of an inductor. The use of 60 volts DC drastically reduces lost power and increases the efficiency and economy of the multiple operator welding apparatus.

The welding apparatus according to the invention comprises a welding module removably supported in a main power frame and a knife blade assembly connecting the module to an electrical bus bar mounted in the main power frame and electrically connected to the power source. Each knife blade assembly preferably comprises three knife blade connectors, corresponding to a positive, negative and common ground conduit. Each knife blade connector comprises a first connector member mounted to and electrically connected to the welding module and second connector member mounted to and electrically connected to the bus bar.

The first connector member engages the second connector member to establish an electrical connection between the module and the bus bar when the module is inserted in the power frame. The welding module is provided with a welding module output terminal for connection to the welding electrode and a plurality of electrical elements connected between the first connector member and the welding module output terminal for providing suitable electrical power to the welding module output terminal. Advantageously, a welding module can be selectively disconnected from the power source and removed from the main power frame.

The first connector member preferably comprises a knife blade and the second connector member preferably comprises an U-shaped clip.

A multiple operator welding apparatus is created by mounting a plurality of welding modules in the main power frame, electrically connected to the main power frame by a plurality of knife blade assemblies. In one embodiment, eight welding modules are mounted in the main power frame.

A dummy drawer, which can be selectively mounted in the main power frame in the place of a welding module provides connection between the main power frame and a welding module removed for use at a remote location. The dummy drawer has an output terminal and a connector member. The connector member on the dummy drawer is connected to the second connector member on the main power frame and the first connector member on the remote welding module is connected to the dummy drawer output terminal. A protective shell preferably substantially surrounds a removed welding module. A connector member on the protective shell can be selectively connected to the first connector member of the welding module. An input terminal on the protective shell, in electrical contact with the shell connector member, can be electrically connected to the dummy drawer output terminal by electrical cables.

Variable current means can be incorporated in the welding module to vary the electrical current supply to the welding electrode. In one embodiment, the variable current means comprises a plurality of resistors and a switching box.

The plurality of electrical components mounted in the welding module can also comprise an inductor electrically connected between the first connector member and the module output terminal. Preferably, the inductor is connected between the plurality of resistors and the welding module output terminal.

The welding apparatus according to the invention can also comprise a source of electrical power, at least one welding electrode and a welding module electrical circuit. The welding electrode is electrically connected to the power source for striking an arc between the workpiece and the electrode. The welding module electrical circuit interconnects the welding electrode and the power source. The circuit comprises an inductor connected in series between the power source and the electrode. The inductor inhibits fluctuations in electrical current resulting from changes in the potential across the arc between the workpiece and the electrode. In one embodiment, the circuit has at least one resistor connected in series with the inductor between the power source and the electrode.

BRIEF DESCRIPTION OF THE DRAWINGS

The invention will now be described with reference to the drawings wherein.

DESCRIPTION OF THE PREFERRED EMBODIMENT

Figure 1:
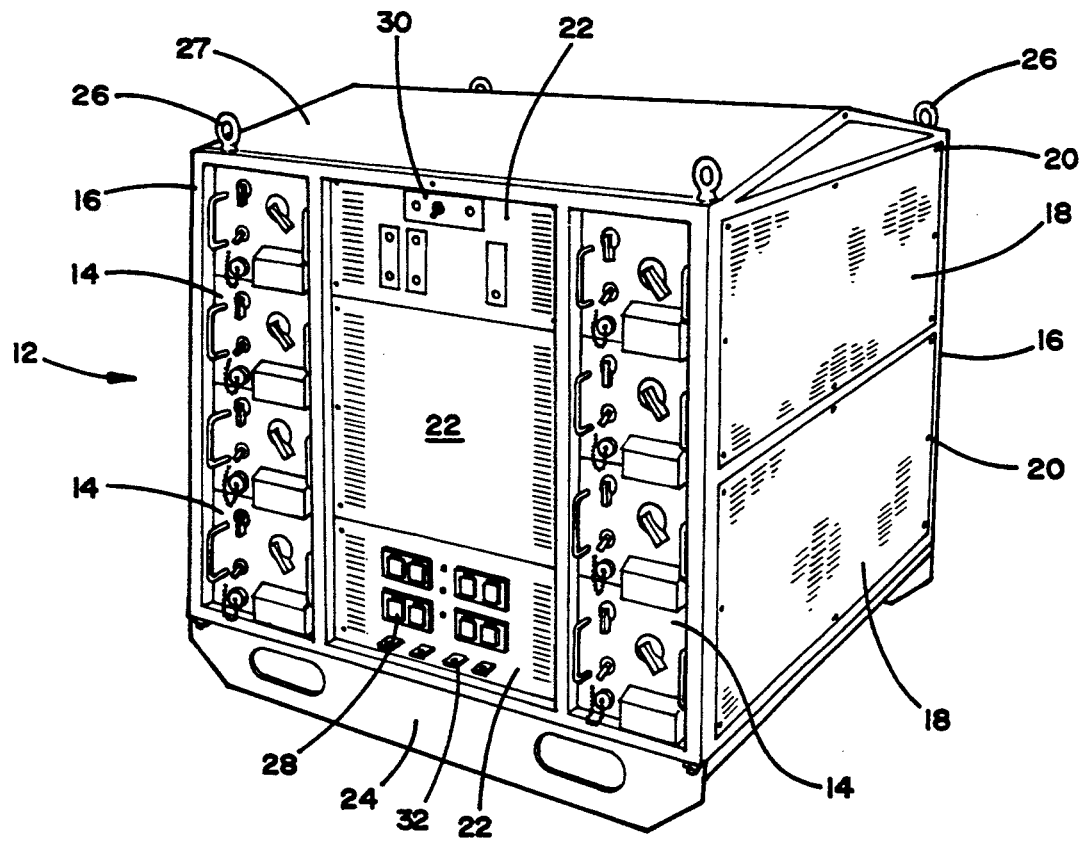
FIG. 1 is a right-perspective view of a multiple operator welding apparatus according to the invention.

Referring now to the drawings and to FIG. 1 in particular, the multiple operator welding apparatus according to the invention comprises a main power frame 12 having a plurality of welding modules 14 selectively mounted therein. The welding modules 14 and the main power frame 12 are supported by a power frame housing 16. A plurality of side panels 18 are selectively mounted to the power frame housing 16 by a plurality of fasteners 20. A plurality of front panels 22 and rear panels (not shown) are similarly selectively fastened to the power frame housing 16. A roof panel 27 is secured to the top of the power frame housing 16 to protect the main power frame from the elements.

The main power frame housing 16 also includes a base 24 adapted for movement of the power frame 12 by a forklift and lifting eyes 26 Secured to the top of the housing 16 for movement of the power frame by a crane or other lifting device.

In the preferred embodiment, a plurality of 115 V outlets 28 are mounted to the front of the main power frame 12 to supply power for a wide variety of accessory equipment such as wire feeders, lights, grinders, etc. Indicator lights 30 can be mounted to the front panels 22 to provide information regarding the status of the unit, such as an on/off power light and a light indicating that the unit is ready for the striking of an arc by one or more welders. A plurality of common ground connections 32 preferably extend from the front of the power frame 12. The common ground connections are electrically connected to the common ground of the main power frame 12 as discussed below.

Figure 2:
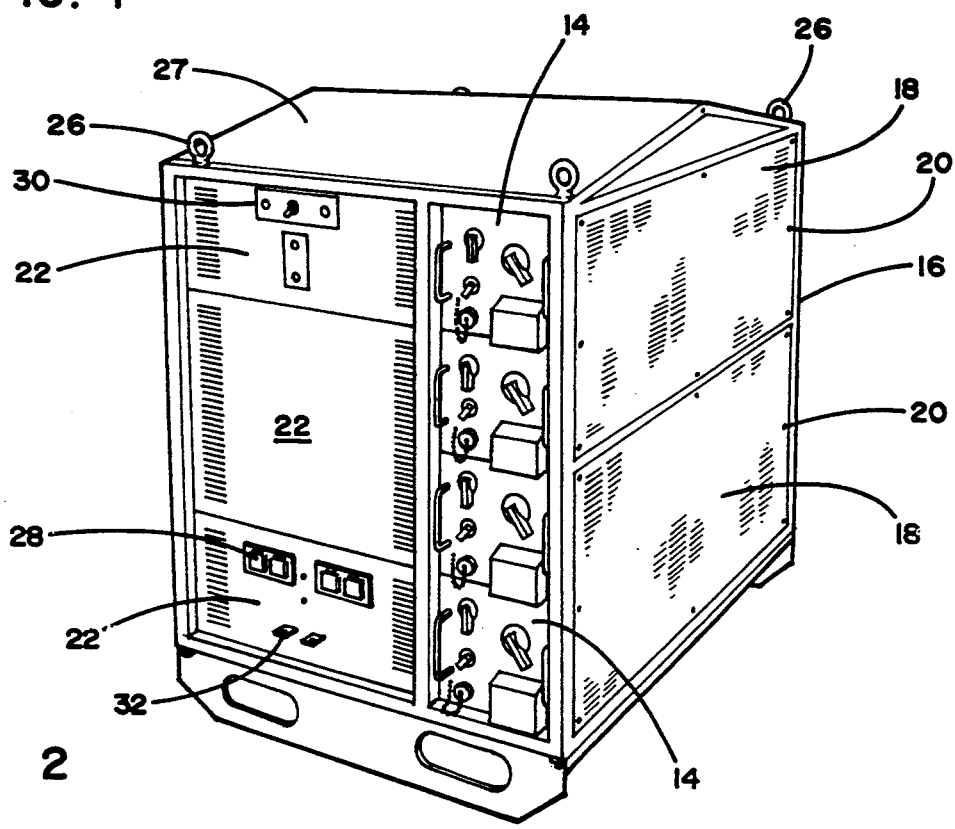
FIG. 2 is a right-perspective view of an alternative embodiment of a multiple operator welding apparatus according to the invention.

In the preferred embodiment, as seen in FIG. 1, eight welding modules 14 are selectively mounted within the main power frame 12. An alternative embodiment is seen in FIG. 2 wherein only four welding modules 14 are selectively mounted within the main power frame 12. It is to be understood that any combination of one or more welding modules 14 within a power frame come within the scope of this invention.

Figure 3:
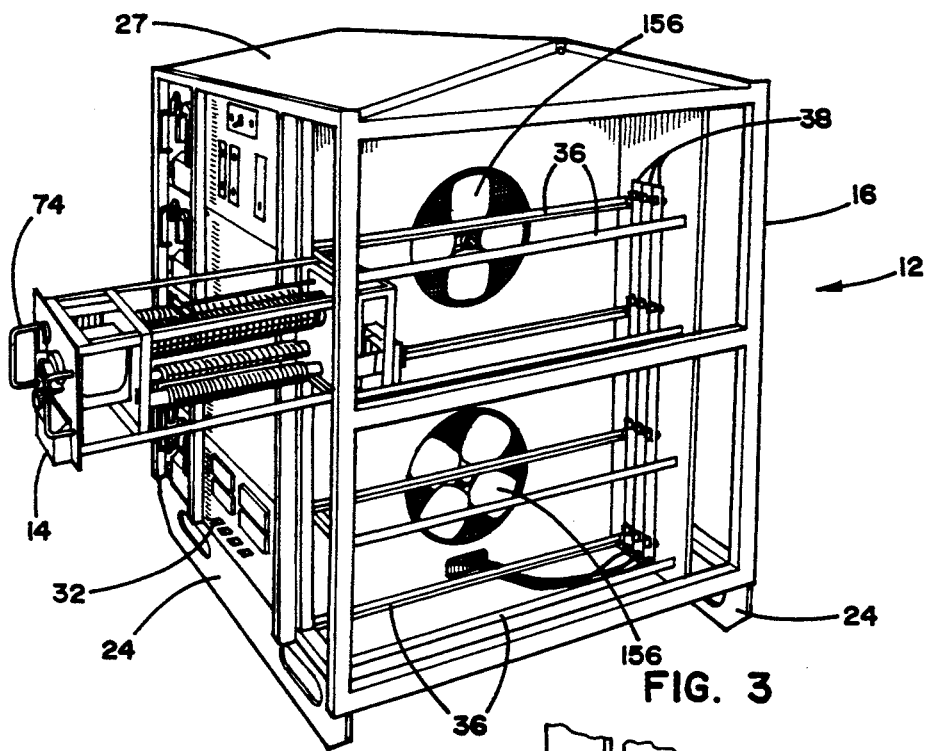
FIG. 3 is a right-perspective view of the first embodiment of the multiple operator welding apparatus showing the welding module support structure.

FIG. 3 is a perspective view of the main power frame 12 of the preferred embodiment seen in FIG. 1, with the side panels 18 removed to expose the support structure and electrical connections for each welding module 14 to the main power frame 12. Each welding module 14 is supported and guided in the power frame housing 16 by module glides 36. The glides 36 permit the modules 14 to easily slide into and out of the power frame housing 16.

Figure 4:
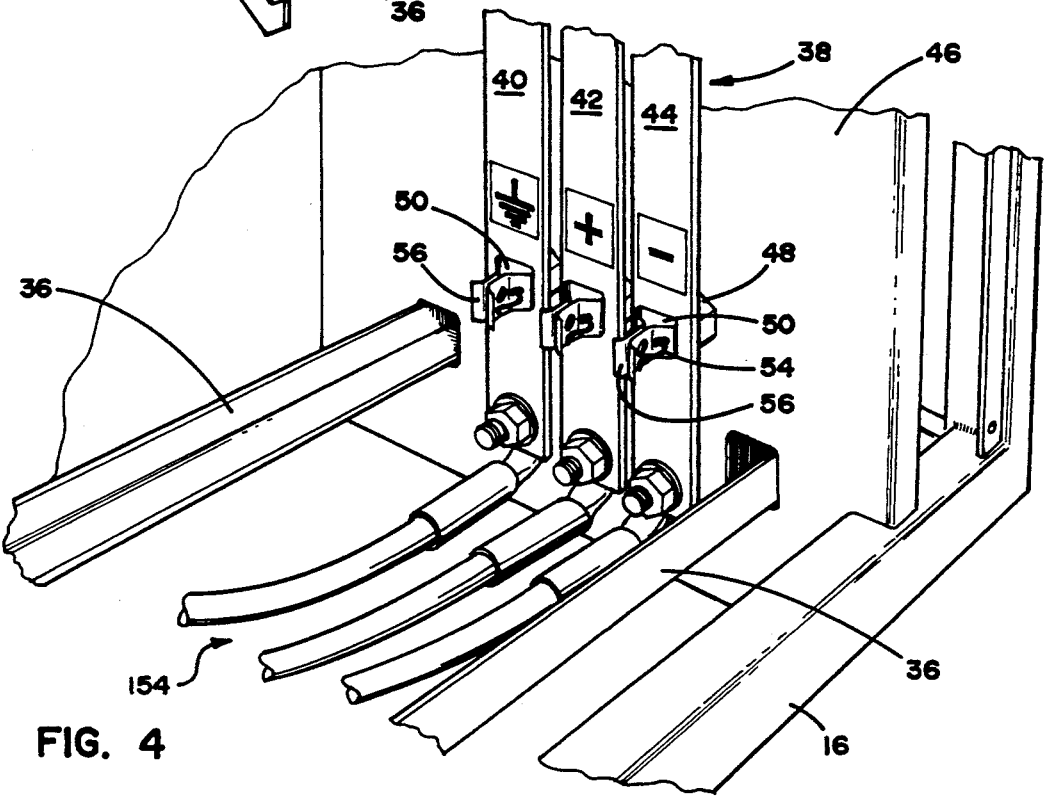
FIG. 4 is a partial perspective view of the structure of the bus bars of the main power frame.

As seen in FIGS. 3 and 4, bus bars 38 are mounted to the power frame housing 16 at the rear of the module glides 36. The bus bars 38 are preferably manufactured of copper or some other highly conductive material and comprise a common ground bar 40, a positive bar 42 and a negative bar 44. The bus bars 38 are mounted to the a support panel 46 by a plurality of insulators 48. The support panel 46 is in turn mounted to the power frame housing 16.

Each module 14 is selectively connected to the main power frame 12 by a knife blade assembly. Each knife blade assembly preferably comprises three knife blade connectors, a common ground, positive and negative knife blade connector. A knife blade connector preferably comprises a first connector member connected to the welding module 14 and a second connector member connected to the main power frame through the bus bars 38. Preferably, the second connector members comprise spring clips 50 mounted to the bus bars 38. As seen in FIGS. 3 and 4, one spring clip 50 is mounted to each of the common ground, positive, and negative bus bars 40, 42 and 44 for each welding module 14 to be mounted in the power frame housing 16. The spring clips 50 are electrically connected to the bus bars 38 and comprise a pair of opposing side members biased by a spring 54 into engagement with one another. The outboard ends of the opposing side members preferably terminate in open flanges 56 to permit easy connection and disconnection of the knife blade connector.

Figure 5:
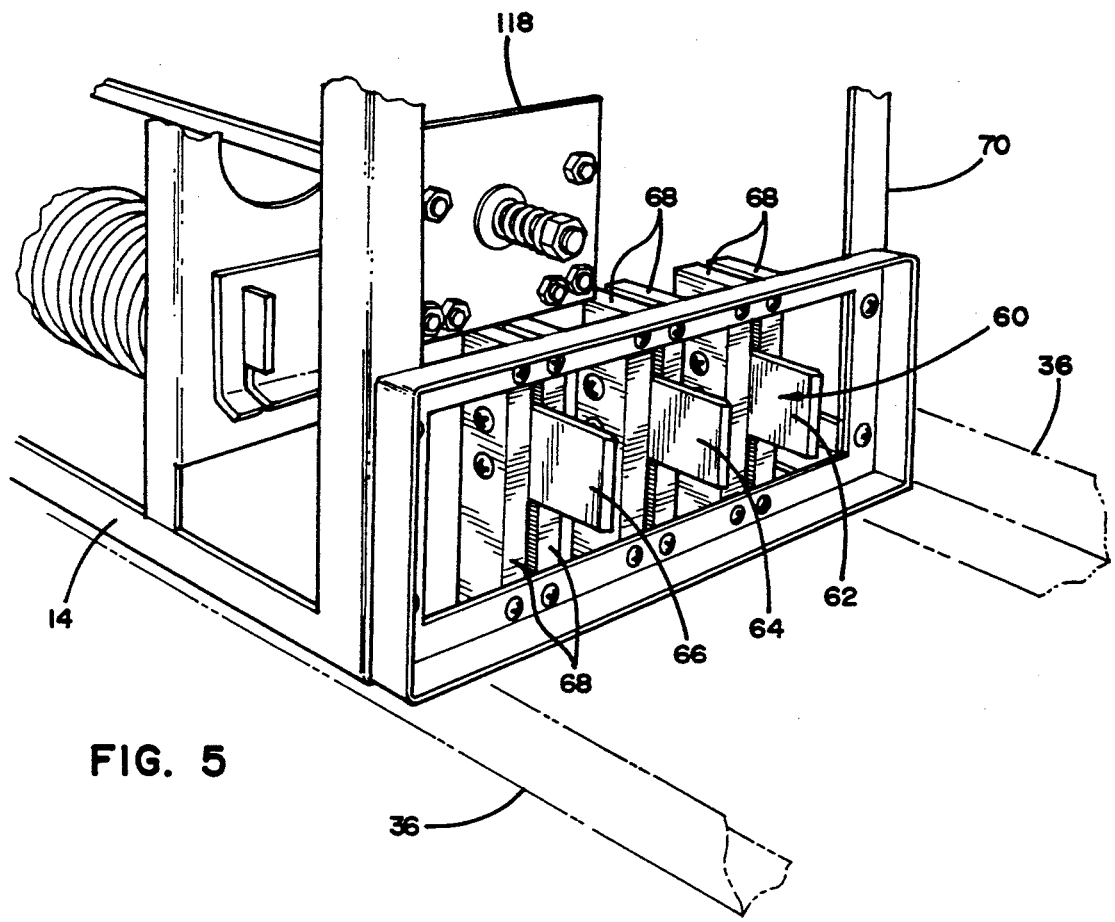
FIG. 5 is a partial perspective view of the rear of a typical welding module according to the invention showing the knife blade connectors.
Figure 6:
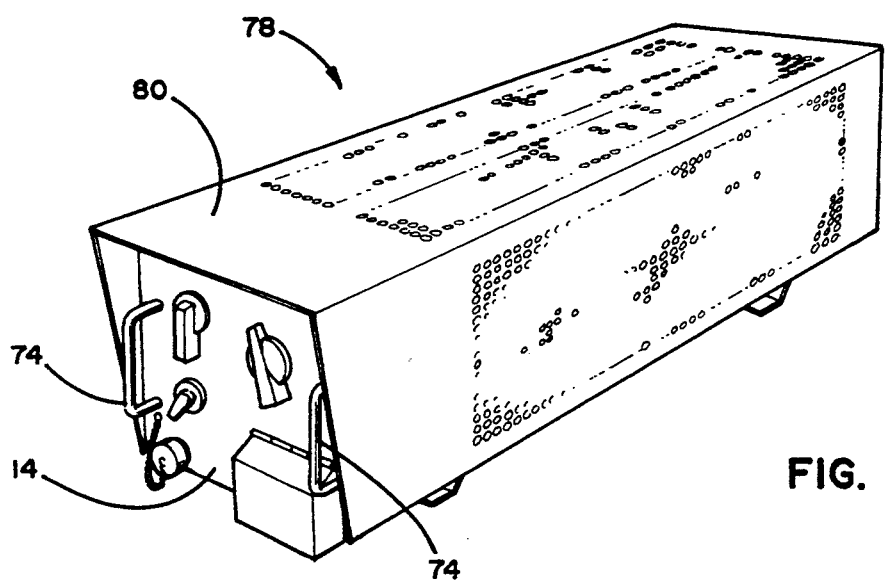
FIG. 6 is a right-perspective view of a remote welding module according to the invention.
Figure 7:
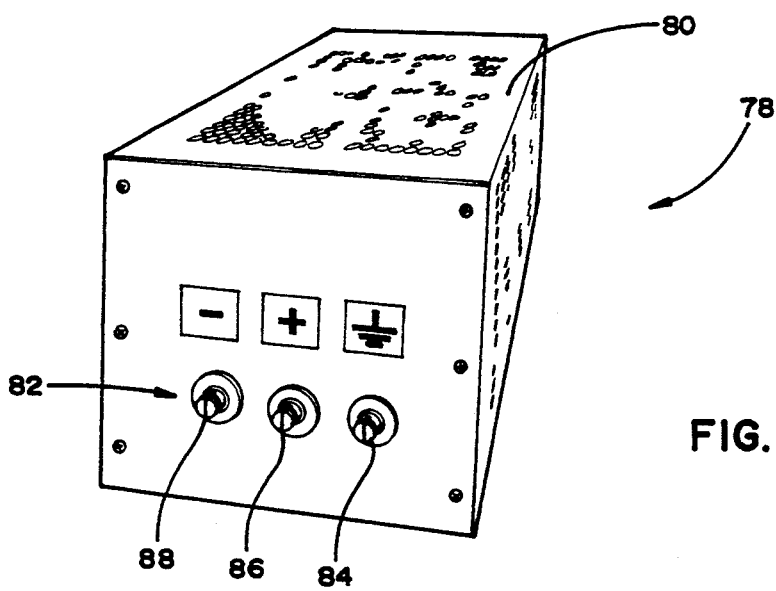
FIG. 7 is a rear perspective view of the remote welding module of FIG. 6.
Figure 8:
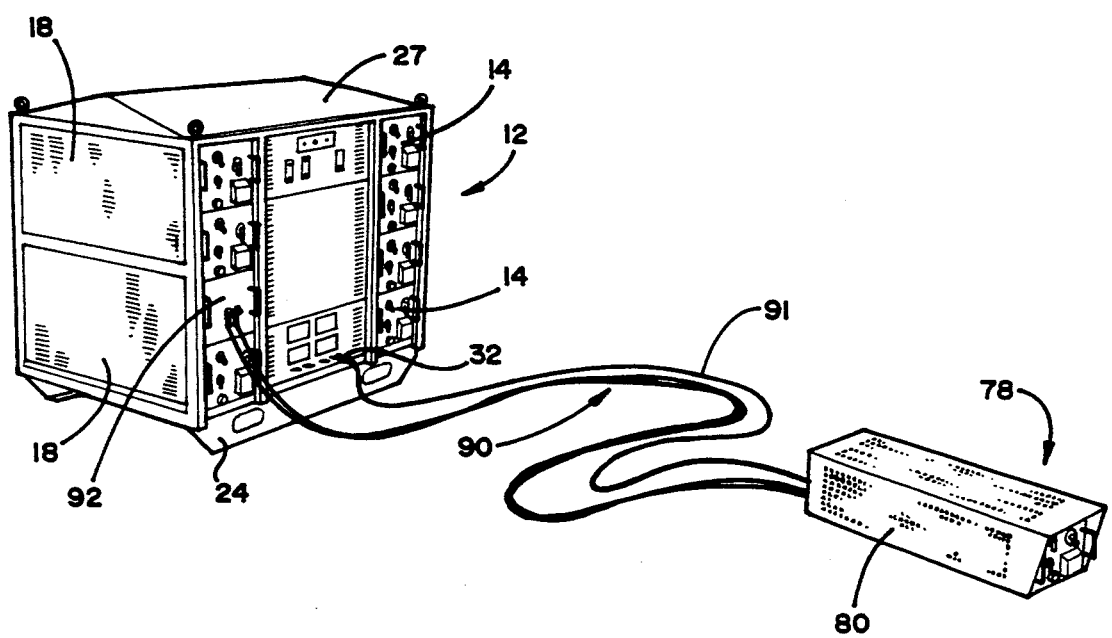
FIG. 8 is a left-perspective view of the remote welding module electrically connected to the main power frame.

The first connector member preferably comprises a knife blade 60 mounted to the rear of each welding module 14 as seen in FIG. 5. A common ground knife blade 62, positive knife blade 64 and negative knife blade 66 are supported by insulating plates 68 at the rear of the welding module housing 70. The outboard end of each knife blade 62 is preferably beveled such that it can be easily received between the open flanges 56 of the spring clips 50. The spring clips 50 and knife blades 60 conduct the electrical power of the main power frame 12 from the bus bars 38 to the electrical circuit of the welding module 14, described below.

As seen in FIG. 3, each welding module 14 can be removed from the power frame housing 16 by grasping the welding module handles 74 and pulling the welding module forward, disengaging the knife blades 60 from the spring clips 50. After the blades 60 have been removed from the clips 50 the welding module 14 can be slidably removed from the main power frame housing 16. The removed welding module 14 can be easily replaced by inserting a new welding module into the aperture of the power frame housing 16 and sliding the replacement welding module along the module glides 36 until the knife blades 60 engage the spring clips 50 at the rear of the module glides 36. Once the knife blades 60 are received within the spring clips 50, the welding module is completely installed and ready to operate.

The knife blade connector construction according to the invention permits easy removal and replacement of a welding module. In addition, the knife blade connector structure according to the invention permits one or more welding modules 14 to be removed from the main power frame 12 without disrupting any of the other welding modules within the main power frame 12. Therefore, if one of the welding modules 14 is not appropriate for the particular welding process, the user can remove the welding module 14 and replace it with an appropriate welding module without turning the power off to the main power frame 12 or otherwise disrupting the other welders operating from the main power frame 12. For example, if a welding module particularly suited for use with a stick electrode welding process is mounted in the main power frame 12, the user can quickly slidably remove the stick electrode welding module and substitute therefor a GMAW welding module for use in a GMAW welding process. As will be discussed further below, the welding apparatus according to the invention is suitable for use with one or more of several different welding modules adapted for particular welding processes or a combination thereof.

Figure 9:
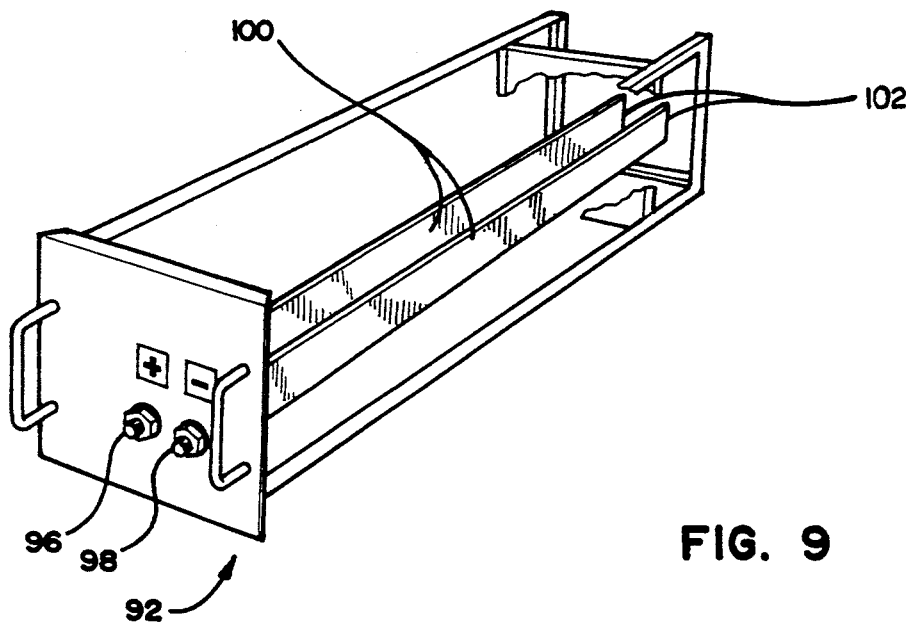
FIG. 9 is a right-perspective view a dummy drawer module for use with a remote welding module.
Figure 10:
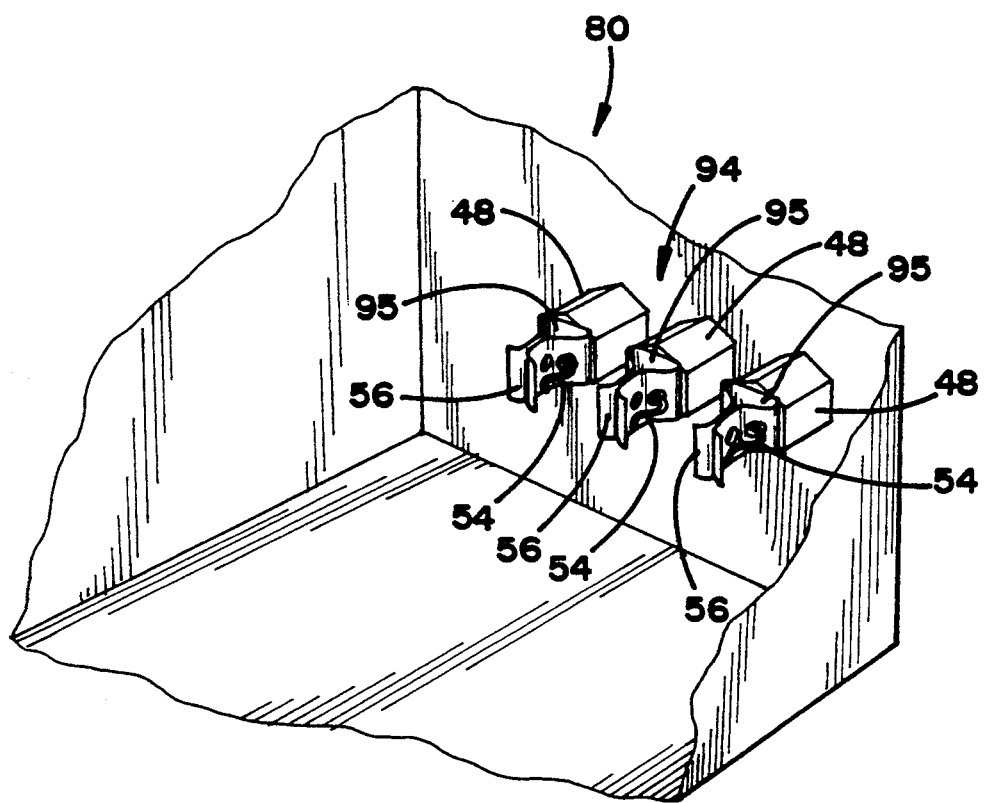
FIG. 10 is a partial perspective view of the structure of the protective shell connector members.
Figure 12:
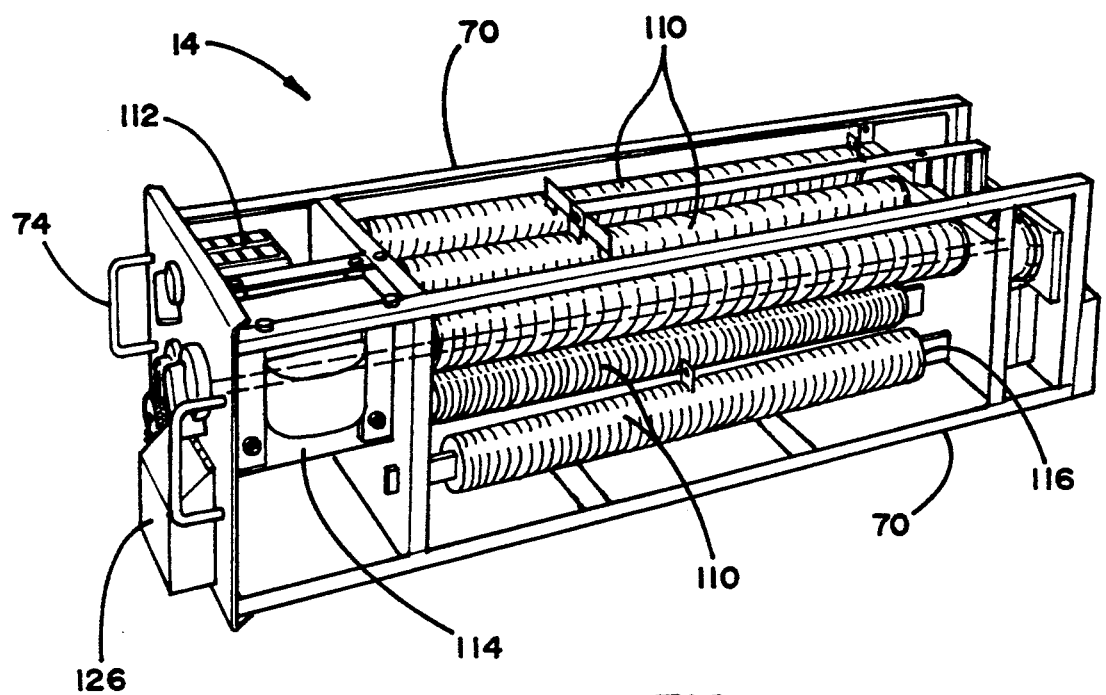
FIG. 12 is a right-perspective view of the structure of a typical welding module according to the invention.

Another benefit of the power frame 12 according to the invention is the ability to remove one or more modules 14 from the power frame housing 16 and use it at a remote location. As seen in FIGS. 6–9, a welding module 14 can be removed from the main power frame 12 and mounted within a protective shell 80 to create a remote welding module 78. The module 14 is slidably mounted in a front aperture (not shown) of the protective shell 80 until the knife blades 60 at the rear of the module housing 70, engage connector members 94 of the protective shell 80. Preferably, the connector members 94 comprise spring clips 95 mounted at the rear of the protective shell 80 (FIG. 10). The spring clips 95 of the protective shell 80 are identical to the spring clips 50 previously described for the main power frame 12. The protective shell spring clips are electrically connected to terminals 82 mounted on the rear wall of the protective shell 80. The terminals 82 comprise a common ground terminal 84, a positive terminal 86 and a negative terminal 88 which are adapted to engage electrical cables. Two cables 90 electrically connect the positive terminal 86 and negative terminal 88 of the remote welding module 78 to the positive terminal 96 and negative terminal 98 of the dummy drawer 92 mounted in the main power frame 12.

An alternative to connecting the cables 90 to a dummy drawer 92 is to connect the cables 90 directly to the rectifiers 144 and 146 behind the front panel 22. This procedure is not recommended because of the obvious electrical hazards.

The common ground terminal 84 of the remote welding module 78 is connected to the common ground connection 32 of the main power frame 12 by a cable 91.

When one welding module 14 is removed and mounted within the protective shell 80, a dummy drawer 92 can be slidably mounted into the aperture of the removed module 14. As seen in FIG. 9, the dummy drawer 92 has output terminals comprising a positive terminal 96 and a negative terminal 98 mounted on the front thereof. The terminals of the dummy drawer 92 are electrically connected to a dummy drawer connector member, preferably dummy drawer bus bars 100. The dummy drawer bus bars 100 extend from the terminals on the front of the dummy drawer 92 to the rear of the dummy drawer 92. Each dummy drawer bus bar 100 has a beveled edge knife blade 102 at the rear terminal end thereof. The knife blades 102 engage the spring clips 50 of the main power frame 12 to electrically connect the remote welding module to the main power frame 12. The dummy drawer bus bars 100 are preferably made of copper or some other highly conductive material.

Through the use of a remote welding module 78, a welder working some distance from the main power frame 12 can take his welding controls mounted on the welding module 14 with him. That is, each time the welder needs to adjust the current or polarity for the particular welding operation, each of these controls can be adjusted directly from the remote welding module 78 which is adjacent the welder. Therefore, a welder can be more efficient by spending more time welding rather than walking to and from the main power frame 12 to adjust the parameters of the welding arc.

As mentioned previously, the main power frame 12 according to the invention is suitable for use with a combination of welding modules specially adapted for particular welding processes. For example, welding modules adapted for a stick welding process can be constructed significantly different from a welding module suitable for GMAW welding processes. However, each of the various welding modules 14 centers around a basic construction which comprises of a welding module housing 70, the previously described knife blades 60 and insulating plates 68, a plurality of resistors 110, a switching box 112 and an inductor 114.

The welding module housing 70 comprises a plurality of support members which are assembled in a rectangular structure to support the various components of the welding module 14. A front panel 106 is supported on the front of the welding module housing 70. The knife blades 60 and insulating plates 68 are mounted at the rear of the welding module 14. A plurality of resistors 110 are mounted on insulating supports 116 which are in turn mounted to the housing 70. The switching box 112 and inductor 114 are mounted adjacent the front panel 106.

Figure 11:
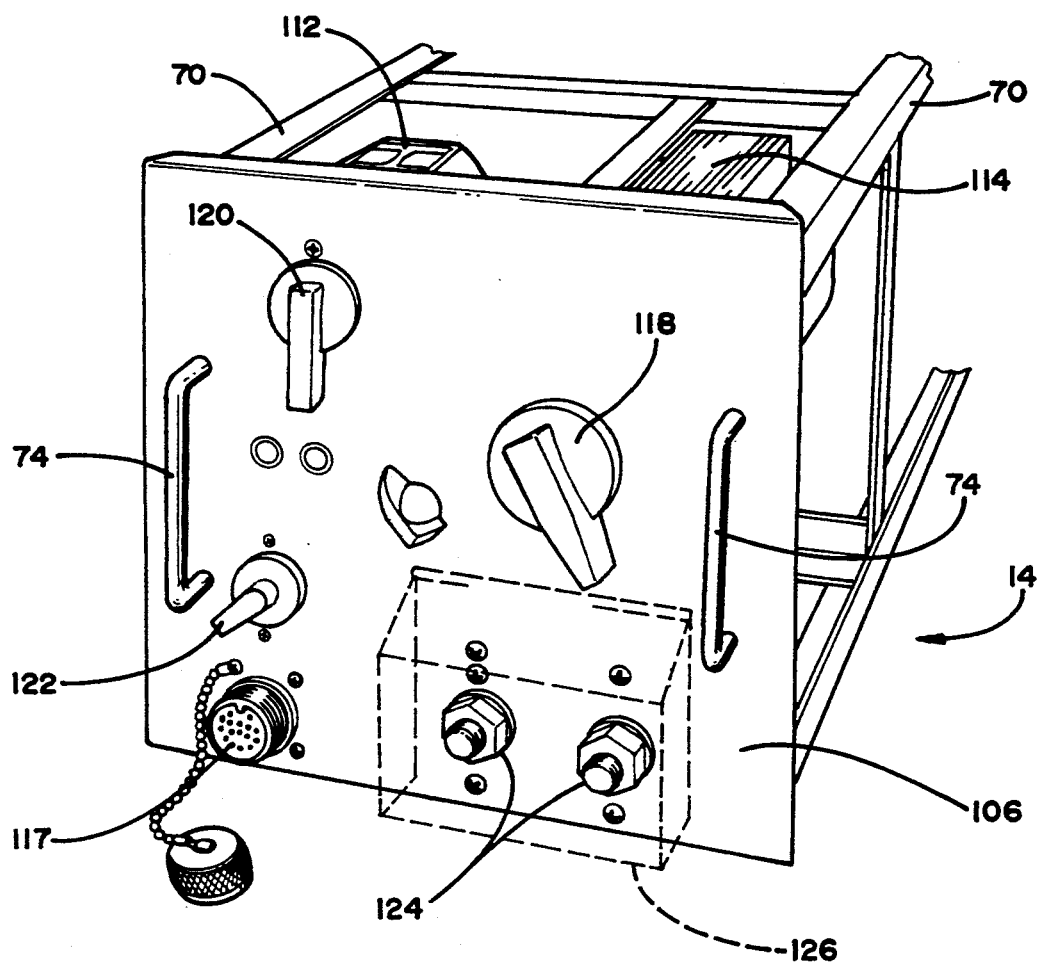
FIG. 11 is a front-perspective view of the front panel of a typical welding module.

As seen in FIG. 11, the front panel 106 of the welding module 14 has a pair of handles 74 mounted thereon for the user to grasp the welding module when removing it from the main power frame 12. An auxiliary plug 117 is mounted on the front panel 106 to provide electrical current for accessory equipment. A polarity switch 118, a coarse current adjusting knob 120, a fine current adjusting switch 122, and welding electrode terminals 124 are also mounted to the front panel 106. A cover 126 can be hingedly mounted above the welding electrode terminals 124 to protect the terminals 124 and avoid electrical shock.

Figure 13:
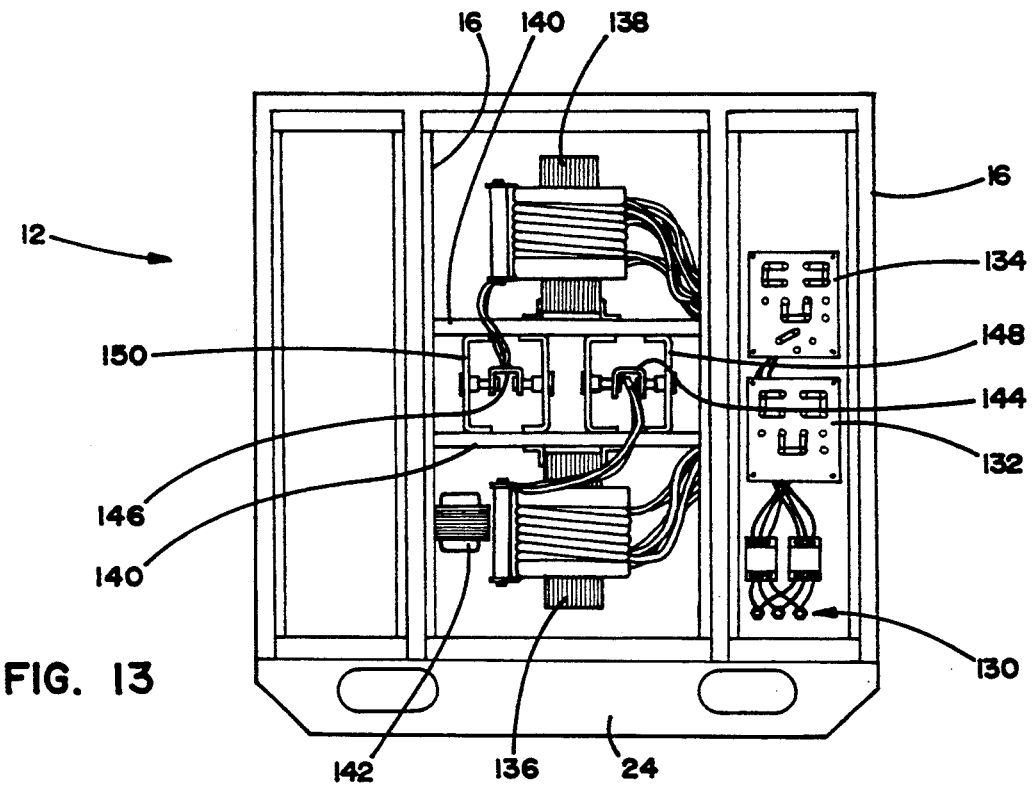
FIG. 13 is a rear elevational view of the main power frame according to the invention.
Figure 14:
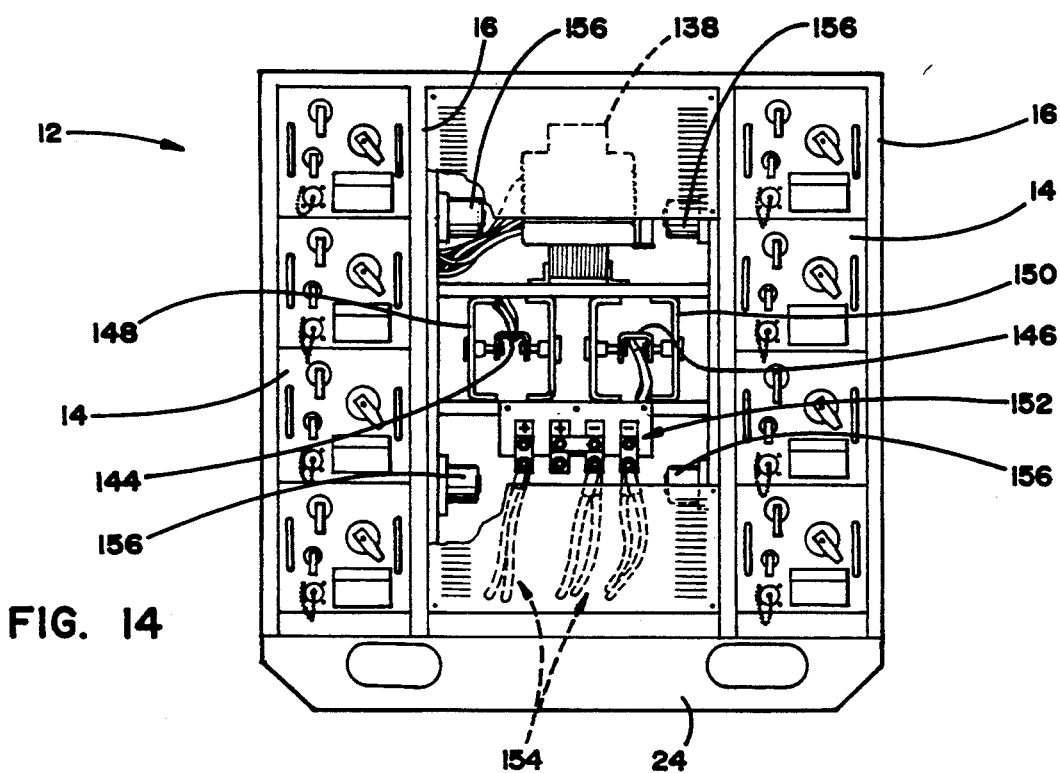
FIG. 14 is a front elevational view of the front of the main power frame according to the invention.
Figure 15:
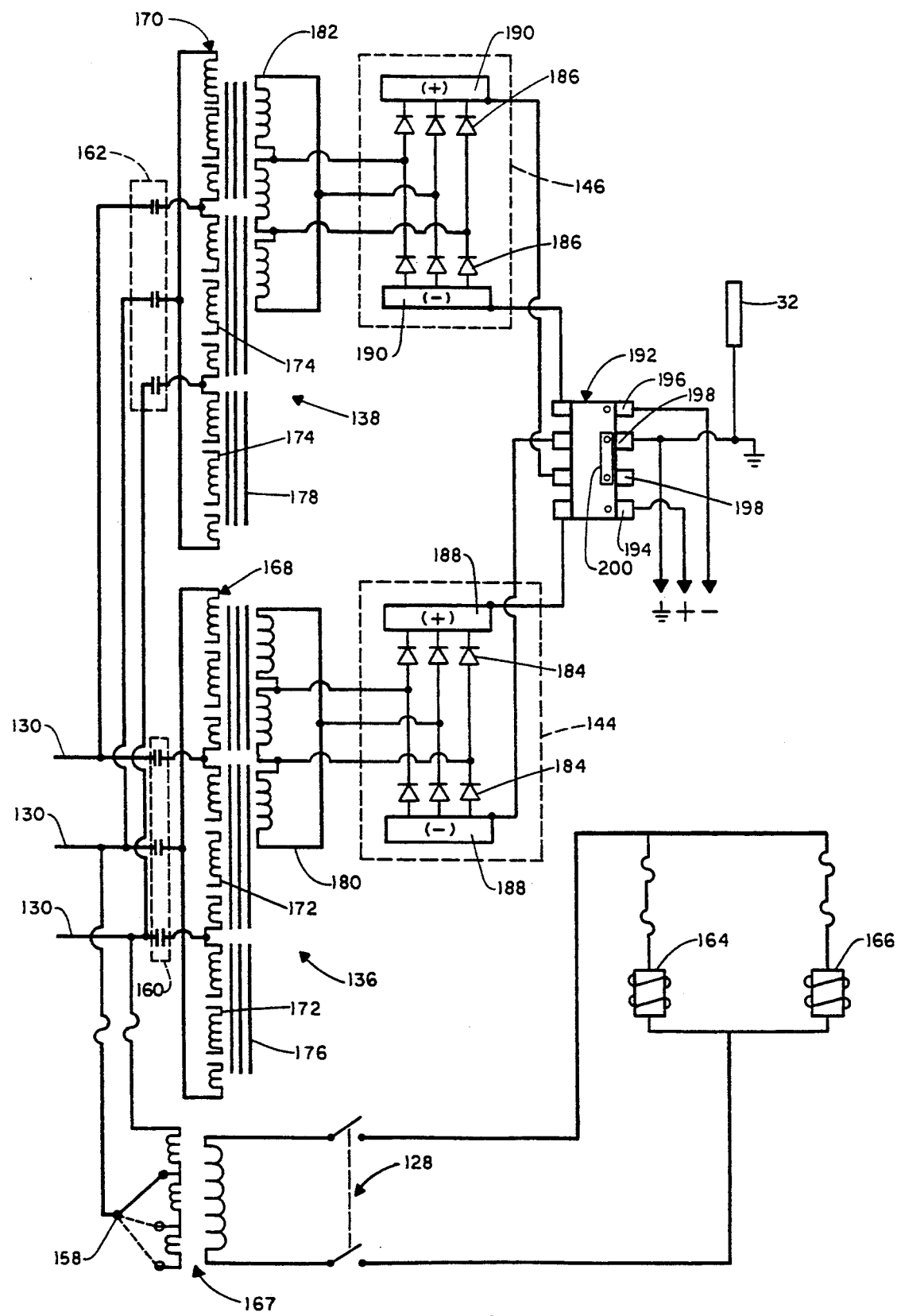
FIG. 15 is an electrical schematic diagram of the main power frame according to the invention.

The structure and electrical circuit of the main power frame 12 can be seen in FIGS. 13, 14 and 15. Three phase line voltage enters the welding apparatus from an outside source through terminals 130. The preferred embodiment of the main power frame is adapted for hook up to one of several line voltages, such as 230 volts, 460 volts and 575 volts. Alternatively, the power frame can be wired for other line voltages such as 220 volts, 380 volts and 440 volts. Tap board links on tap boards 132 and 134 are used to adjust the power to the power frame according to the incoming line voltage.

Tap board links 158 are also used to adjust the power supplied to the primary contacts 160 and 162. The primary contacts 160 and 162 are energized by contactor coils 164 and 166. Current is applied to the coils 164 and 166 from auxiliary transformer 167 when switch 128 is closed by manual operation. As a result, the primary contacts 160 and 162 will be operated, permitting the flow of current through the primary contacts 160 and 162 to transformers 136 and 138.

The transformers 136 and 138 comprise primary windings 168 and 170, transformer cores 176 and 178 and secondary windings 180 and 182, respectively. The amount of voltage step-down required from the transformers 136 and 138 varies depending upon the incoming line voltage. Therefore, the primary windings 168 and 170 have a plurality of sub-windings 172 and 174, respectively, which are selectively connected pursuant to the level of the incoming line voltage. The sub-windings 172 and 174 are selectively connected through connections on the tap boards 132 and 134. The tap board connections for the primary windings 168 and 170 of the transformers 136 and 138 are conventional.

The voltage passing through the primary windings 168 and 170 of the transformers is stepped-down to an acceptable level, preferably 45 volts, through the cooperation of the primary windings 168 and 170, the transformer cores 176 and 178 and the secondary windings 180 and 182. Current is also supplied to the auxiliary transformer 167 for the creation of 115 volts for use by the accessory equipment connected to the 115 volt outlets 28.

From the secondary windings 180 and 182 of the transformers 136 and 138, the current flows to the rectifiers 144 and 146. The rectifiers 144 and 146 convert the current from alternating current to direct current and have three incoming legs with six diodes 184 and 186. The rectifiers also incorporate conductor/heat sinks 188 and 190. The conductor/heat sinks 188 and 190 collect the current flowing from the three legs of the diodes 184 and 186 and conduct the resulting current to the parallelling panel 192. The resulting voltage as a result of rectification of the three phase current is 60 volts. The conductor/heat sinks 188 and 190 have a large surface area which can dissipate heat which can build in the rectifiers 144 and 146. As seen in FIG. 14, electrical fans 156 are provided in the main power frame 12 to remove heat from the unit.

The parallelling panel 192 collects the current from the two transformers 136 and 138 and creates a dual polarity welding apparatus thereby permitting welders to convert the welding process at each module 14 from straight to reverse polarity, if desired. The positive terminal from the first rectifier 144 is connected to a positive member 194. The negative terminal from the second rectifier 146 is connected to a negative member 196 of the parallelling panel 192. The negative terminal from the first rectifier 144 and the positive terminal from the second rectifier 146 are connected to common ground members 198 which are connected by a conducting member 200 to create the common ground of the main power frame 12.

The electrical power of the main power frame 12 is conducted from the parallelling panel 192 to the bus bars 38 by a plurality of electrical cables 154.

While the embodiment of the main power frame 12 discussed above includes two primary transformers 136 and 138 and an output paralleling panel 192, the welding apparatus according to the invention can be operated with a single transformer without the benefit of dual polarity welding capability or with a single transformer with two secondary windings.

Figure 16:
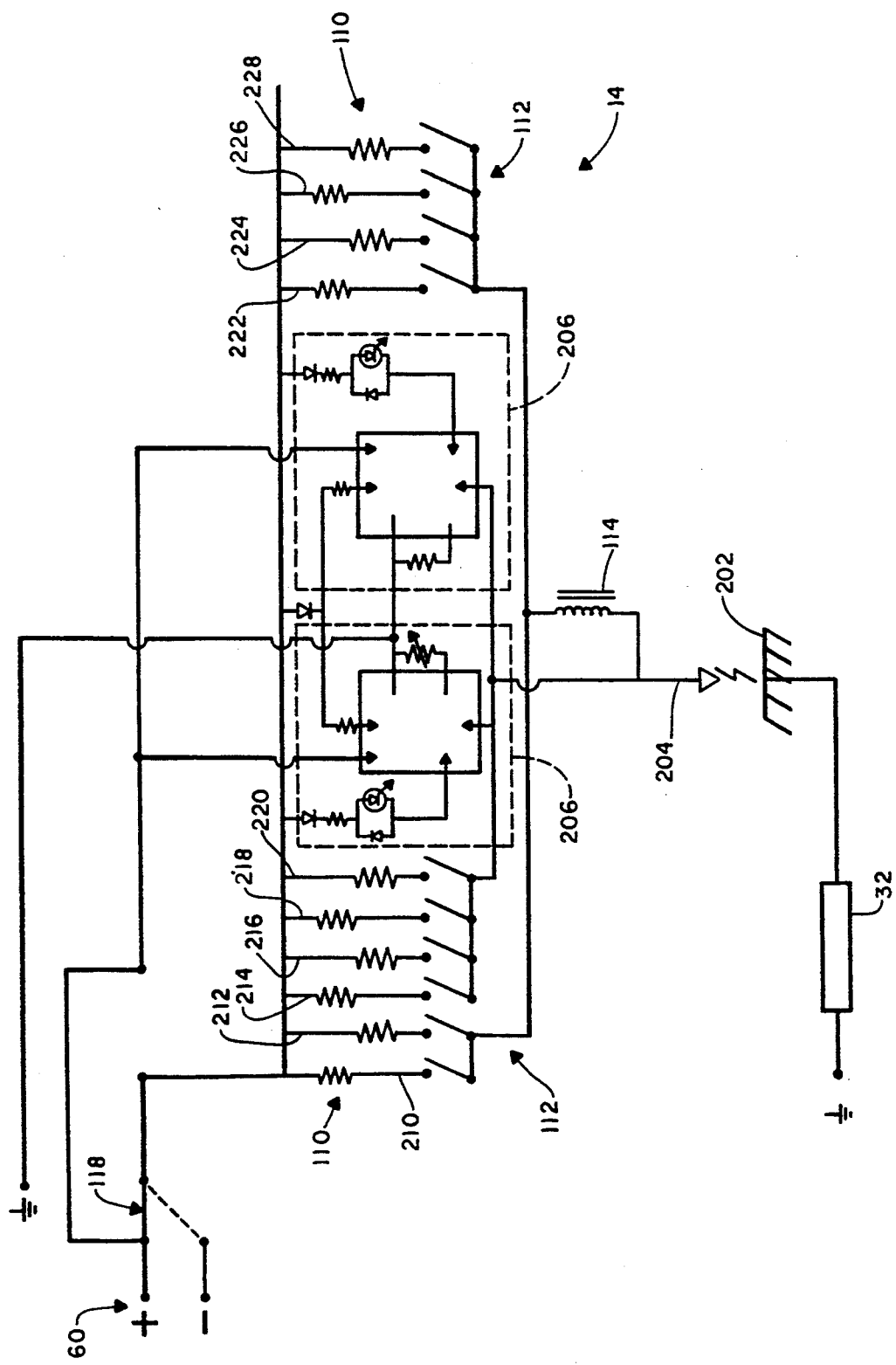
FIG. 16 is an electrical schematic diagram of a welding module according to the invention.

As seen in FIGS. 4 and 16, each welding module 14 receives electrical power from the bus bars 38 through the spring clips 50 and knife blades 60. Electrically connected to the positive and negative knife blades 64 and 66 is a polarity switch 118 for converting the welding module from straight to reverse polarity, or vice versa. It is to be understood that the polarity switch 118 is optional for a welding module suitable for use in the welding apparatus according to the invention.

When the welding module is used for straight polarity welding, as seen in FIG. 16, the workpiece 202 is electrically connected to the common ground terminal 32 of the main power frame 12, and the welding electrode 204 is electrically connected to the negative terminal via the polarity switch 118. Conversely, when the welding module is used for reverse polarity welding, the welding electrode 204 is electrically connected to the positive terminal through the polarity switch 118. For reverse polarity welding the workpiece continues to be connected to the common ground terminal 32.

In addition, the welding module 14 according to the invention preferably incorporates one or more demand pulse boards 206 which selectively supplies additional current to the welding arc in the event that the voltage drops below a desired level. The structure of the demand pulse boards 206 is described in U.S. Pat. No. 4,523,077 issued Jun. 11, 1985 to Hoyt, Jr. et al., which is expressly incorporated herein by reference. A welding module according to the invention having two demand pulse boards 206 is particularly well suited for use in a GMAW welding process. A welding module 14 having a single demand pulse board 206 incorporated therein is particularly well suited for a FCAW welding process or some SMAW processes whereas a welding module 14 according to the invention having no demand pulse boards 206 incorporated therein is particularly well suited for other SMAW processes.

As seen in FIG. 16, the switching box 112 cooperates with the plurality of resistors 110 to supply a variable amount of current from the main power frame to the welding electrode 204. The switching box is connected to the coarse current adjusting knob 120 (FIG. 11) and the fine current adjusting switch 122 (FIG. 11) to permit the welder to select the desired current level for the particular welding procedure. In the preferred embodiment, the coarse current adjusting knob 120 and switching box 112 adjust the current in fifty amp increments whereas the fine current adjusting switch 122 and switching box adjust the current in five amp increments. The Table A provided below shows the resistance of the resistors contained in the electrical circuit of the preferred embodiment. The switching box 112 permits adjustment of the current from 0 to 395 amps in 5 amp increments by selectively connecting the resistors 110 in the electrical circuit between the welding electrode 204 and the knife blades 60.

TABLE A

| Resistor Number | Resistance-Ohms |
| --- | --- |
| 210 | 0.7 |
| 212 | 0.7 |
| 214 | 0.7 |
| 216 | 0.5 |
| 218 | 0.5 |
| 220 | 0.5 |
| 222 | 7.0 |
| 224 | 3.5 |
| 226 | 2.3 |
| 228 | 2.3 |

Shown in FIG. 16 is an inductor 114 connected between certain terminals of the switching box 112 and electrode 204. In the preferred embodiment, only the first 145 amps of current supplied to the welding electrode 204 through the switching box 112 pass through the inductor 114. Through experimentation, the inventors have discovered that the beneficial effects of the inductor 114 on the welding arc are predominate in the low current conditions. The preferred inductor 114 has an inductance of approximately 1.8 milliHenrys for use with an incoming welding module voltage of 60 volts.

The welding module 14 according to the invention having the inductor incorporated therein provides two significant advantages. First, the inductor 114 dramatically stabilizes the welding arc, thereby reducing defects in the resulting weld bead. Secondly, the welding apparatus according to the invention results in significant power savings over known welding apparatuses due to the lower input voltage.

The inductance of the inductor 114 resists changes in the current flow between the welding electrode 204 and the workpiece 202. This is of primary importance when the particular welding process employed demands rapid changes in the arc voltage. It also reduces the amount of spatter by opposing sudden current changes. For example, when a welder raises the welding electrode 204, the resistance of the arc between the workpiece 202 and the electrode 204 increases, causing the current to decrease and the voltage to increase. Eventually, the resistance will be so great that the arc will be extinguished. The arc extinguishes more quickly for a lower input voltage such as 60 volts than for a higher voltage of 80 volts. Therefore, the standard input voltage, used in prior art systems, is 80 volts. However, the incorporation of the inductor 114 in the electrical circuit of the welding apparatus according to the invention slows the change in current as well as changes in the arc voltage. Therefore, a welding module having an inductor 114 and an input voltage of 60 volts has substantially the same stability as the traditional 80 volt welding module. Through the use of a welding module having resistors 110 and the inductor 114 electrically connected therein, a constant current welding module which resists current change is created.

Figure 17:
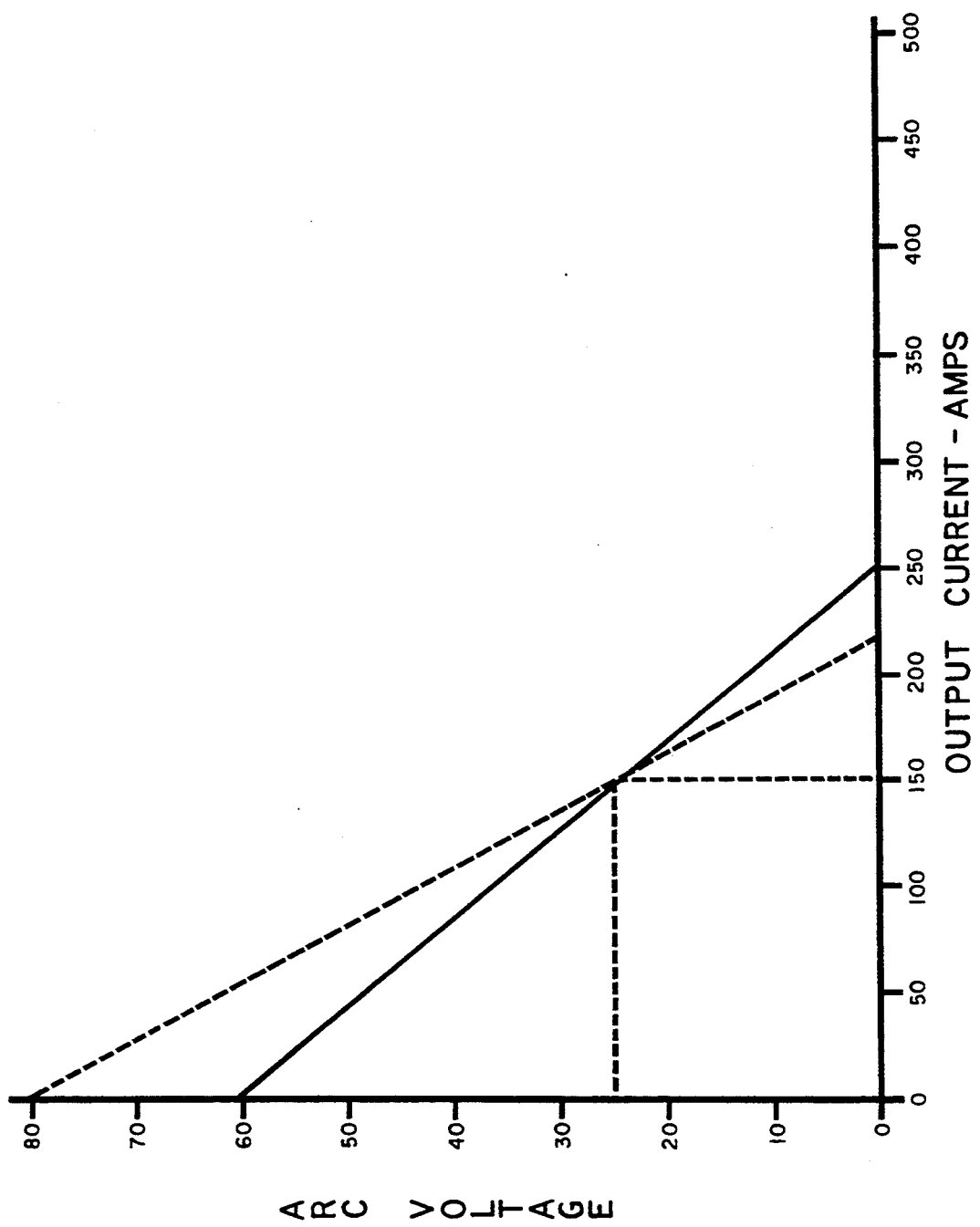
FIG. 17 is a voltage-amperage curve for a typical welding module according to the invention.

The effect of the inductor 114 on the stability of the arc weld can be more easily understood by reference to FIG. 17, an example of a voltage-amperage curve for a preset current of 150 amps. This V-A curve is for a welding module not incorporating any of the demand pulse boards 206. A welding module according to the invention having an input voltage of 60 volts is shown in solid lines whereas a welding module having an input voltage of 80 volts is shown in dashed lines.

The stability of a welding arc is a function of the slope of the V-A curve. The slope is equal to the change in output or arc voltage over the change in the output current. The slope of the 60 volt welding module is less than the slope of the 80 volt welding module. Therefore, changes in the arc voltage have a more dramatic effect on the output current for the 60 volt welding module than for the 80 volt welding module.

The second benefit of the inductor is greater efficiency and significant power savings. The voltage within the welding module according to the invention is reduced from the incoming welding module voltage to the lower arc voltage by resistors 110 or other suitable means. Since electric power is a function of the voltage, it will be apparent that the power lost in reducing the voltage from 80 volts to 25 arc volts is far greater than the power lost in reducing the voltage from 60 volts to 25 arc volts. The 60 volt system power losses are thirty-six percent (36%) less than the power losses of an 80 volt system. Therefore the 60 volt system is significantly more energy efficient. In addition, the resistors necessary to obtain the desired arc voltage from an 80 volt system are considerably larger and heavier than the resistors necessary to obtain the desired arc voltage in the 60 volt system. Therefore, the 60 volt system has significant energy efficiency and weight advantages over the 80 volt system.

The welding module 14 according to the invention creates a satisfactory weld bead with an input welding module voltage of 60 volts because of the incorporation of the inductor 114. These advantages in addition to the ability to substitute and replace welding modules within a single main power frame create an efficient and highly improved multiple operator welding apparatus.

The welding apparatus according to the invention creates the first true multiple operator/multiple process welding apparatus capable of GMAW. The welding apparatus according to the invention permits multiple welders to operate from a single main power frame. The welding apparatus according to the invention also permits welders from the same power frame to conduct different welding procedures. For example, one welder can utilize a stick electrode welding module while a second welder utilizes a GMAW welding module and yet a third welder utilizes a FCAW welding module. Moreover, one or more of the welding modules can be removed from the main power frame and replaced while the power frame is in operation without disturbing other welders which are operating from the main power frame.

Yet another benefit of the welding apparatus according to the invention is the ability of one or more welders to remove the welding module from the main power frame and electrically connect the remote welding module to the main power frame to use it at a remote welding site.

While particular embodiments of the invention have been shown, it will be understood, of course, that the invention is not limited thereto since modifications can be made by those skilled in the art, particularly in light of the foregoing teachings. Reasonable variation and modification are possible within the foregoing disclosure of the invention without departing from the spirit of the invention.

The embodiments of the invention in which an exclusive property or privilege is claimed are defined as follows:

1. A welding apparatus for supplying electrical current to a welding module comprising;
    a power source;
    a main power frame having at least one receptacle;
    a bus bar mounted in the main power frame and electrically connected to the power source;
    a welding module selectively mounted in the receptacle of the main power frame and having a welding module output terminal for electrical connection to a welding electrode;
    a connector having a first connector member mounted to and electrically connected to the welding module and a second connector member mounted to and electrically connected to the bus bar, the first connector member being selectively connected to the second connector member;
    a dummy drawer selectively mounted in the receptacle of the main power frame when the welding module is removed therefrom, the dummy drawer comprising a dummy drawer connector member selectively connected to the second connector member and an output terminal electrically connected to the dummy drawer connector member;
    a protective shell which selectively receives the welding module when the module is removed from the receptacle, the protective shell comprising a protective shell connector member selectively connected to the first connector member and protective shell input terminals electrically connected to the protective shell connector members;
    at least one electrical cable for electrically connecting the protective shell input terminals to the dummy drawer output terminals when the welding module is removed from the receptacle and the dummy drawer is received therein;
    wherein the welding module can be selectively removed from the main power frame and mounted in the protective shell and the dummy drawer can be selectively mounted in the main power frame and electrically connected to the welding module, thereby permitting the welding module to be used a distance from the main power frame.

2. A welding apparatus according to claim 1 wherein the main power frame further comprises glides for slidably mounting the welding module.

3. A welding apparatus according to claim 1 wherein the first connector member comprises a knife blade.

4. A welding apparatus according to claim 1 wherein the second connector member comprises a U-shaped clip.

5. A welding apparatus according to claim 1 wherein a plurality of welding modules are mounted in the main power frame and electrically connected to a plurality of connectors.

6. A welding apparatus according to claim 5 wherein eight welding modules are mounted in the main power frame and electrically connected to eight connectors.

7. A welding apparatus according to claim 1 wherein the welding module further comprises variable current means to vary the electrical current supplied to the electrode.

8. A welding apparatus according to claim 7 wherein the variable current means comprises a plurality of resistors and a switching box.

9. A welding apparatus according to claim 1 wherein the bus bar is a positive bus bar.

10. A welding apparatus according to claim 9 further comprising a negative bus bar mounted in the main power frame and electrically connected to the power source and a second connector electrically connecting the negative bus bar and the welding module.

11. A welding apparatus according to claim 9 further comprising a common ground bus bar mounted in the main power frame, electrically connected to the power source and having a third connector electrically connecting the common ground bus bar and the welding module.

12. A welding apparatus according to claim 1 wherein the welding module comprises an electrical circuit between the first connector and the welding module output terminal, the circuit comprising an inductor and a plurality of resistors, the inductor being connected in series with a portion of said plurality of resistors and connected in parallel with a portion of said plurality of resistors such that the inductor stabilizes the welding arc for only a portion of the current.

13. A welding apparatus according to claim 1, wherein the main power frame further comprises glides for slidably mounting the welding module therein.

14. A welding apparatus comprising;
   a source of electrical power;
   at least one welding electrode electrically connected to the power source for striking an arc between a workpiece and the electrode; and
   a welding module electrical circuit interconnecting the at least one welding electrode and the power source, the circuit comprising a plurality of resistors which are selectively connected in the electrical circuit to create an output current of the circuit within a prescribed range, an inductor connected between the power source and the electrode, the inductor being connected in series with some of the plurality of resistors and being connected in parallel with the remainder of the plurality of resistors such that the inductor stabilizes the welding arc for only a portion of the current.

15. A welding apparatus according to claim 14 wherein the power source further comprises a first transformer.

16. A welding apparatus according to claim 15 wherein the first transformer comprises sub-windings which are selectively connected to obtain a desired stepped down voltage depending upon the voltage supplied to the power source.

17. A welding apparatus according to claim 15 wherein the power source further comprises a second transformer.

18. A welding apparatus according to claim 17 wherein the second transformer comprises sub-windings which are selectively connected to obtain a desired stepped down voltage depending upon the voltage supplied to the power source.

19. A welding apparatus according to claim 17 wherein the power source further comprises a paralleling panel having a positive member, a negative member, and a common ground member for selectively providing dual polarity power to the welding electrode.

20. A welding apparatus according to claim 19 wherein the welding module electrical circuit further comprises a polarity switch for changing the relative polarity of the welding electrode with respect to the workpiece.

21. A welding apparatus according to claim 14 wherein the power source further comprises a rectifier for converting alternating current as supplied to the power source to direct current for supplying to the welding electrode.

22. A welding apparatus according to claim 14 wherein the power source further comprises a contactor switch and contactor coil for selectively completing an electrical circuit in the power source.

23. A welding apparatus according to claim 14 wherein the inductor has an inductance substantially equal to 1.8 milliHenrys.

24. A welding apparatus according to claim 14 wherein the source of electrical power supplies power to the welding module electrical circuit at approximately 60 volts.

25. A welding apparatus according to claim 14 wherein the welding module electrical circuit further comprises a switching box which directs current through the welding module electrical circuit and the inductor up to a desired limit, whereby current which exceeds the desired limit bypasses the inductor.

26. A welding apparatus according to claim 14 wherein the welding module electrical circuit further comprises an auxiliary plug for supplying electrical power to accessory equipment.

27. A welding apparatus according to claim 14 wherein the plurality of resistors comprises at least one series resistor and at least one parallel resistor and the inductor is connected in series with the at least one series resistor between the power source and the electrode and the at least one parallel resistor is connected in parallel between the power source and the electrode with the series combination of the at least one series resistor and inductor.

28. A welding apparatus according to claim 27 and further comprising a switching box connected in series between the power source and the plurality of resistors to selectively include the plurality of resistors in the electrical circuit between the power source and the electrode, thereby varying the current supplied to the electrode.

29. A welding apparatus according to claim 27 wherein the at least one series resistor produces a lower range of output current for the prescribed range of output current and the at least one parallel resistor produces an upper range of output current for the prescribed range of current, the lower range of current being less than the upper range of current.

30. A welding apparatus according to claim 27 wherein the output current for the plurality of resistors is in the range of 0 to 395 amps, the output current for the at least one series resistor is in the range of 0 to 145 amps and the output current for the at least one parallel resistor is in the range of 145 to 395 amps.

31. A welding apparatus for supplying electrical current to a welding module comprising;
   a power source;
   a main power frame having at least one receptacle;
   a welding module selectively mounted in a receptacle in the main power frame and electrically connected to the power source, the welding module having an electrical circuit comprising a welding module output terminal for connection to a welding electrode and a welding module input terminal for connection to the power source; and
   a dummy drawer received in the receptacle of the main power frame when the welding module is removed therefrom, the dummy drawer occupying the receptacle and comprising a portion of an electrical circuit between the power source and the welding module, the dummy drawer being electrically connected to the power source and the welding module input terminal being electrically connected to the dummy drawer;

whereby the welding module can be operated while received in the receptacle of the power frame or can removed from the receptacle of the main power frame, replaced with the dummy drawer, and electrically connected to the dummy drawer such that the welding module can be used at a distant location from the main power frame.

32. A welding apparatus according to claim 31 wherein eight welding modules are slidably mounted in eight receptacles of the main power frame and are electrically connected to the power source.

33. A welding apparatus according to claim 31 and further comprising a protective shell which is selectively mounted to and substantially surrounds the welding module when the module is removed from the receptacle.

34. A welding apparatus according to claim 31 wherein the welding module further comprises variable current means to vary the electrical current supplied to the welding electrode.

35. A welding apparatus according to claim 34 wherein the variable current means comprises a plurality of resistors and a switching box.

36. A welding apparatus according to claim 31 wherein the main power frame further comprises glides for slidably mounting the welding module therein.

37. A welding apparatus according to claim 31 and further comprising;

at least two bus bars mounted in the main power frame and connected to the power source, a first of said at least two bus bars being a positive bus bar and a second of said at least two bus bars being a negative bus bar;

a welding module knife blade connector mounted between said welding module and said at least two bus bars, the welding module knife blade connector comprising;

a positive knife blade and a negative knife mounted to said welding module; and a positive spring clip and a negative spring clip mounted and electrically connected to said positive and negative bus bars, respectively, the positive and negative knife blades being received in the positive and negative spring clips, respectively, when the module is received in the receptacle; and a dummy drawer knife blade connector comprising a positive knife blade and negative knife blade, the positive and negative knife blades being received in the positive and negative bus bar spring clips, respectively, when the dummy drawer is received in the receptacle.

38. A welding apparatus according to claim 37 wherein the dummy drawer further comprises positive and negative output terminals and further comprising a protective shell which is selectively mounted to and substantially surrounds the welding module when the module is removed from the receptacle, the protective shell comprising;

a positive spring clip and a negative spring clip which receive the positive and negative knife blades, respectively, of the welding module when the protective shell is mounted to the module; and positive and negative output terminals electrically connected to the positive and negative spring clips, the positive and negative output terminals being adapted to receive one end of positive and negative connecting cables, respectively, the other ends of the connecting cables being mounted to the positive and negative output terminals, respectively of the dummy drawer.

39. A welding apparatus according to claim 37 and further comprising;

a common ground bus bar mounted in the main power frame and connected to a common ground of the power source;

a common ground knife blade mounted to said welding module;

a common ground spring clip mounted to and electrically connected to said common ground bus bar;

a dummy drawer common ground knife blade mounted to said dummy drawer and received in the common ground spring clip when the welding module is removed from the receptacle and the dummy drawer is received in the receptacle.

40. A welding apparatus for supplying electrical current to a welding module comprising;

a power source having at least one transformer to step down an incoming line voltage to an outgoing supply voltage of 60 volts;

a main power frame;

a welding module mounted in the frame and electrically connected to the power source to receive the outgoing power source supply voltage of 60 volts, the welding module having an electrical circuit comprising;

a plurality of resistors mounted therein for altering the outgoing current supplied from the power source to a welding electrode; and an inductor mounted in series with at least a portion of the resistors to stabilize the welding arc;

whereby the welding module, despite the low supply voltage of 60 volts, is suitable for use for a wide variety of welding processes including stick arc welding, shielded metal arc welding, gas tungsten arc welding, flux core arc welding, air carbon arc gouging and gas metal arc welding.

41. A welding apparatus according to claim 40 wherein a plurality of remote welding modules are selectively mounted in the main power frame and electrically connected to the power source.

* * * * *